Patented May 2, 1933                                                     1,907,132

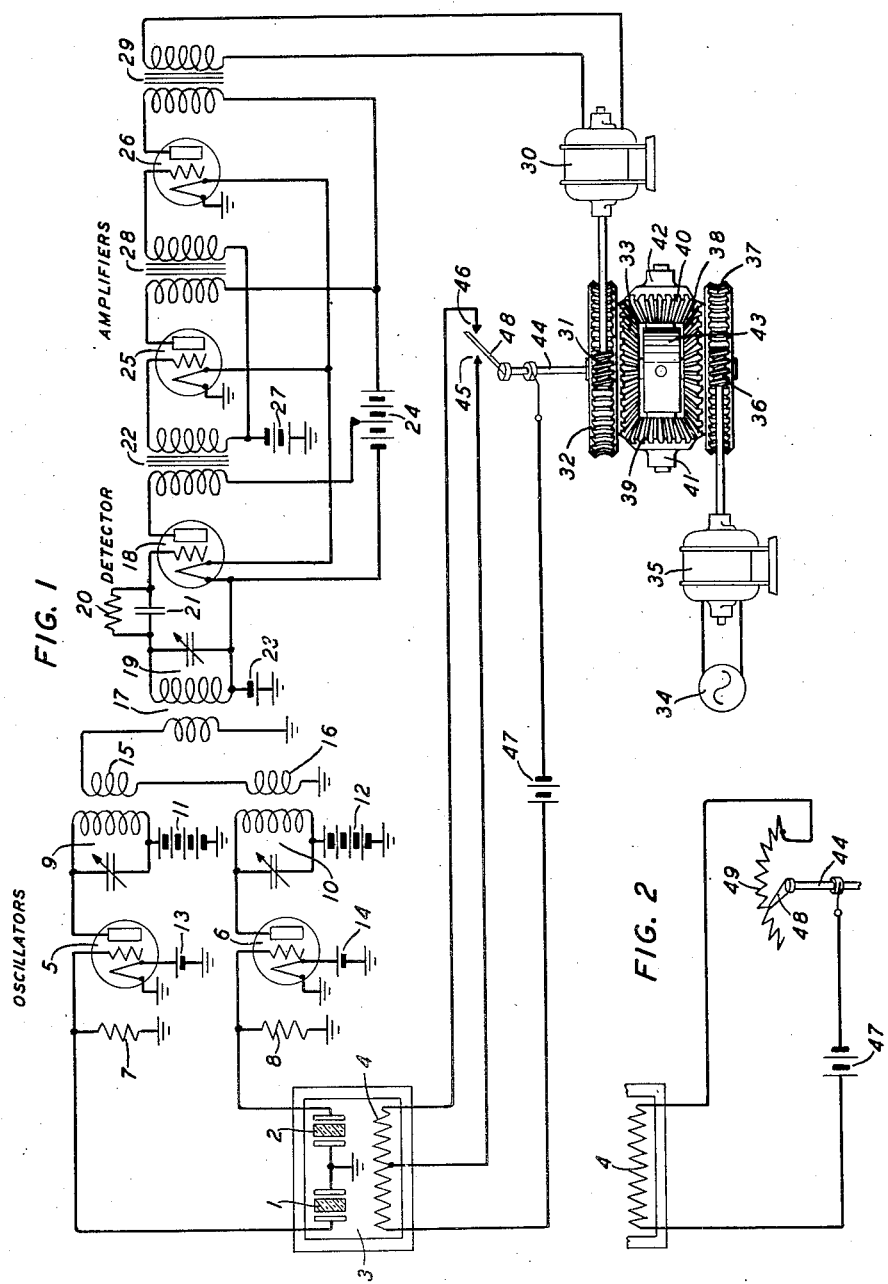

UNITED STATES PATENT OFFICE

GEORGE M. THURSTON, OF NEW YORK, N. Y., ASSIGNOR TO BELL TELEPHONE LABORATORIES, INCORPORATED, OF NEW YORK, N. Y., A CORPORATION OF NEW YORK

CONSTANT FREQUENCY SYSTEM

Application filed August 28, 1930. Serial No. 478,380.

This invention relates to constant frequency systems, and more particularly to such systems in which an element or circuit which is subject to variations in its frequency characteristics with variations in temperature is used to control the constant frequency.

A reliable source of constant frequency is useful in a number of applications, for example, in radio broadcasting, particularly in a single side band system, in picture transmission and television, eliminating the necessity for a synchronizing channel, carrier telegraphy and telephony, and for laboratory reference standards.

This invention also relates to constant temperature systems, and finds an application wherever a very precise control of temperature is desired. It may be used for controlling the temperature of a mechanical element, such as a piezo-electric crystal or tuning fork, to avoid variations in the frequency of vibration due to temperature changes when such element is used to control a constant frequency source, as more particularly described herein, or for controlling temperature of laboratory apparatus for conducting delicate experiments as, for example, where it may be desired to maintain the temperature of a nerve tissue or culture medium constant within one one-thousandth of a degree.

In the production of a wave of constant frequency, where it is desired to maintain frequency constant to an accuracy of such frequency constant to an accuracy of say 1 part in 10,000,000 or better, the best results have been attained through the use of a quartz crystal, utilizing its piezo-electric properties to translate mechanical vibrations into electrical oscillations. When quartz crystals are so used there are a number of factors which may affect the frequency with changes in temperatures besides the temperature coefficient of the crystal itself. For example, a change in the dimensions of the electrodes or of the crystal holder may change the capacity effects in parallel or in series with the crystal. There are also other factors not connected with temperature which may influence the frequency, such as a change in the voltage across the electrodes. By the use of this invention such extraneous effects, whether due to temperature changes or not, are compensated by an adjustment in temperature to a value which will maintain the frequency constant. In other words, a frequency change may be detected to a much greater degree of accuracy than a temperature change, and therefore a change in frequency may be used to control the temperature with much greater accuracy.

In the application of the above principles, two quartz crystals having opposite temperature coefficients may be enclosed within a constant temperature oven and each crystal used to control the frequency of an oscillator. The output of the two oscillators may then be combined to produce a beat note which may be of any desired frequency, from one cycle per second to several million cycles. A convenient frequency for the beat tone is 60 cycles per second, as this permits the use of a simple means of control. This beat note of 60 cycles may then operate a synchronous motor which is connected to a differential gear. The other shaft of the differential gear may be operated by a synchronous motor from an ordinary power supply for example, a power supply of a frequency of 60 cycles per second, and the differential movement of the gear used to operate control means for regulating the temperature of the crystal oven. If the crystals are vibrating at frequencies of the order of 1,000,000 cycles per second, a change in the beat frequency of one cycle per second will correspond to a combined change of one cycle per second between the frequencies of the two quartz crystals. Similarly a change of one cycle per second in the frequency of the commercial current will cause a change of one cycle per second between the two high frequencies. That is assuming equal changes in the two crystals, a change of 1.67% or 1 cycle per second in the frequency of the 60 cycles commercial supply will cause a change of the order of only .00005% in the frequency of each of the quartz crystals. If a commercial source of current does not provide sufficient stability for this system any suitable means for producing a constant low frequency may be provided, as for example, an oscillation generator controlled by a tuning fork, or other mechanical vibrating element.

In the drawing Fig. 1 is a schematic diagram of a circuit for accomplishing the above purposes and Fig. 2 is a schematic of an alternative circuit for the heat control.

In Fig. 1 two crystals 1 and 2 are enclosed within a constant temperature oven 3 which is heated by a current through resistance 4. These crystals are included respectively in two oscillator circuits consisting of vacuum tubes 5 and 6, grid leaks 7 and 8, variably tuned output circuits 9 and 10, plate batteries 11 and 12 and filament batteries 13 and 14. The output circuits are coupled respectively to inductances 15 and 16 and impressed through transformer 17 on detector 18. The detector circuit consists of a variably tuned input circuit 19, grid leak 20, condenser 21, the primary output of transformer 22, filament battery 23 and plate battery 24. The plate and filament batteries are common to the amplifiers as well as the detector. The oscillations produced in the two oscillators first mentioned, are intermodulated in the detector and then amplified in two stages in amplifiers 25 and 26 which are inductively coupled to the detector 18 and to each other through transformers 22 and 28. These amplifiers have a common grid biasing battery 27. The output wave of amplifier 26 is impressed through transformer 29 on a synchronous motor 30. The synchronous motor, by means of a worm and worm gear 31 and 32 drives gear 33 of a differential gear arrangement. A separate source of electrical current 34, which may be a commercial power source, drives a second synchronous motor. This second synchronous motor, by means of a second worm and worm gear 36 and 37, drives the opposite gear 38 of the differential gear arrangement. These two gears 33 and 38 differentially drive pinion gears 39 and 40, which are rotatably mounted on shafts 41 and 42. These shafts terminate in housing 43, to which shaft 44 is rigidly secured. The gears 32 and 33 are rotatably mounted on shaft 44 with a proper direction of rotation of the gears 33 and 38 only in case one of the synchronous motors moves more rapidly than the other will the housing 43 revolve. When it revolves, it causes a rotation of the shaft 44. This will cause contact arm 48 to revolve and make contact with one or the other of contact points 45 or 46 depending on the direction of its revolution which, of course, depends upon which synchronous motor is traveling at the greater speed. The contact points 45 and 46 control a circuit including battery 47 and heating resistance 4 which, as is indicated, is mounted within the constant temperature oven.

As a specific example of the operation of the device, if crystal 1 is a positive temperature coefficient crystal which has a resonant period of 1,000,060 cycles per second, and crystal 2 is a negative coefficient crystal which has a resonant vibration of 1,000,000 cycles per second, an increase in temperature within the constant temperature oven will cause the frequency of the positive temperature coefficient crystal 1 to increase, while it will cause the frequency of negative temperature coefficient crystal 2 to decrease. This will increase the beat frequency produced in the detector, which is impressed through the amplifier on the synchronous motor 30, and will cause the gear 33 to travel at a faster rate than gear 38, and will in turn cause the housing 43 to revolve and the arm 48 to make contact with point 46. This will throw more resistance into the heating circuit and cause a less amount of heat to be supplied to the constant temperature oven 3. The temperature of the oven will then decrease, causing the frequency of crystal 1 to decrease and the frequency of crystal 2 to increase. The frequency of the beat note will therefore decrease, synchronous motor 30 will slow down, and the previous rate of vibration of the two crystals and temperature of the oven will be restored.

Fig. 2 shows an alternative arrangement for the heating circuit. The elements are similarly numbered to show their correspondence to the elements in Fig. 1. By the arrangement shown in Fig. 2 a progressive change in the degree of heat furnished to the constant temperature oven may be provided. Instead of two contact points 39 and 40 a rheostat 49 is provided. The rotation of the shaft 44 causes a contact arm 48 to revolve, and increases or decreases the amount of resistance from rheostat 49 in series with the heating element 4 in the heating circuit.

It is not necessary that the temperature coefficients of crystals 1 and 2 be of opposite sign so long as they are of different value.

If of different value but not of different sign, similarly as in the case of crystals of opposite coefficients, an increase in temperature will cause a change in the beat frequency in one direction, while a decrease in frequency will cause a change in the opposite direction. Or one of the crystals may have a zero coefficient. In the latter case a part of the oscillations produced by the zero coefficient crystal may be taken off and applied to other use before combining the remainder with the oscillations from the other crystal to produce the beat note which controls the temperature.

What is claimed is:

1. In combination, two piezo-electric oscillators having temperature coefficients of opposite sign, a common heater for the piezo-electric elements of said oscillators, and means controlled by the difference frequency of said oscillators to control said heater.

2. In a substantially constant frequency system, a source of oscillations having a positive temperature coefficient of frequency, a second source of oscillations having a negative temperature coefficient of frequency, means to combine the oscillations of said sources to produce a wave of frequency equal to the difference in frequencies of said two oscillations, and a common means responsive to said wave for controlling the temperature conditions to which said sources are subject, whereby the frequencies thereof are controlled.

3. In combination, an oscillator the frequency of which is dependent upon temperature, a second oscillator the frequency of which is also dependent upon temperature but which varies in an opposite direction with change in temperature, means for impressing oscillations from both said oscillators upon a combining device to produce currents the frequency of which is dependent upon the frequencies of both of said oscillators and means under the control of oscillations resulting from the combining operation for regulating the temperatures to which said oscillators are subjected.

4. In combination, an oscillator the frequency of which is controlled by a piezo-electric crystal, the natural frequency of which increases with increase in temperature, a second oscillator, the frequency of which is controlled by a piezo-electric crystal, the natural frequency of which decreases with increase in temperature, a demodulator connected to said oscillators to receive oscillations therefrom and to produce oscillations of their difference frequency, a common oven containing heating means and both said piezo-electric crystals, and means under the control of said difference frequency oscillations for controlling said heating means.

5. The method of regulating the frequency of an oscillator which is subject to temperature variations and whose frequency varies with temperature variations which comprises comparing the frequency of oscillations derived therefrom with a definite fixed frequency obtained from another source and regulating the temperature of said oscillator in accordance with frequency variations of said oscillations from a fixed relationship to said fixed frequency, whereby the frequency of said oscillator is varied.

6. In combination, two oscillators of relatively high but different frequencies, piezo-electric elements for controlling the frequency of each oscillator, a temperature-controlled enclosure surrounding said elements, a source of low frequency currents of fairly constant frequency and means operated conjointly by oscillations from said source and by the difference frequency oscillations derived from said two oscillators for regulating the temperature of said enclosure.

7. The method of regulating the frequencies of two piezo-electric controlled oscillators which are subjected to common temperature conditions and whose frequencies vary with changes in said conditions, which comprises producing beat frequency oscillations by interaction of the output oscillations of said oscillators and by control of said common temperature conditions by said beat frequency oscillations, maintaining the beat frequency substantially constant.

8. The method of maintaining substantially constant the frequency of a piezo-electric oscillator whose frequency is a function of temperature, which comprises producing a wave whose frequency is controlled by the frequency of said piezo-electric oscillator and controlling the temperature of said oscillator in accordance with variations in the frequency of said wave, whereby the frequency of said oscillator is varied.

9. The method of producing a substantially constant frequency by controlling the temperature of a plurality of piezo-electric crystals, which comprises producing a plurality of waves of the natural frequencies of said crystals, producing a difference frequency component of said waves, and controlling the temperature of said crystals by said difference frequency wave.

10. Means for maintaining a substantially constant frequency comprising a piezo-electric oscillator having a desired temperature coefficient whose frequency is to be controlled, a second piezo-electric oscillator of a different temperature coefficient, means for maintaining said piezo-electric oscillators at the same temperature, means for producing a difference frequency between the frequencies of said piezo-electric oscillators, and means for varying the temperature of said piezo-electric oscillators in response to slight variations in the frequency of said difference frequency.

11. Means for producing a substantially constant frequency comprising an oscillator whose frequency is controlled by a piezo-electric crystal having a positive temperature coefficient, a second oscillator whose frequency is controlled by a piezo-electric crystal having a negative temperature coefficient, means for producing a wave whose frequency is the difference of the frequencies of said oscillators and means responsive to variations in said difference frequency for regulating the temperature of said crystals so as to correct for slight variations in the frequency of said first mentioned oscillator.

12. Means for producing a constant frequency comprising two oscillators, a piezo-electric crystal for controlling the frequency of each of said oscillators, means for maintaining said piezo-electric crystals at the same temperature, means for producing a wave whose frequency is the difference of the frequencies of said oscillators, and means for increasing the temperature of said crystals in response to an increase in said difference frequency, and decreasing the temperature of said crystals in response to a decrease in said difference frequency.

13. A source of oscillations of variable frequency dependent upon temperature, frequency regulating means therefor through temperature control, a source of constant frequency oscillations, two synchronous motors each supplied with oscillations from one of said sources, and a differential gear system each driving gear of which mechanically coupled to one of said motors, the driven gear operating to actuate said frequency regulating means.

14. In combination, two piezo-electric oscillators having different temperature coefficients, a common heater for the piezo-electric elements of said oscillators, and means controlled by the difference frequency of said oscillators to control said heater.

15. A crystal oscillator having a positive temperature coefficient, a second crystal oscillator having a negative temperature coefficient, means for combining oscillations from said oscillator to produce oscillations of their difference frequency, and means under the control of said difference frequency oscillations to control the temperature conditions to which said two oscillators are subjected.

16. The method of regulating the frequency of a piezo-electric oscillator which varies with temperature variations, by control of its temperature, which comprises producing a wave whose frequency is controlled by the frequency of said piezo-electric oscillator, and regulating the temperature of said oscillator in accordance with frequency variations of said wave, whereby the frequency thereof is varied.

In witness whereof, I hereunto subscribe my name this 27 day of August 1930.

GEORGE M. THURSTON.

DISCLAIMER 1,907,132.—*George M. Thurston*, New York, N. Y. CONSTANT FREQUENCY SYSTEM. Patent dated May 2, 1933. Disclaimer filed December 29, 1934, by the assignee, *Bell Telephone Laboratories, Incorporated.*

Hereby enters this disclaimer to said claims of said Letters Patent which are in the following words, to wit:

"5. The method of regulating the frequency of an oscillator which is subject to temperature variations and whose frequency varies with temperature variations which comprises comparing the frequency of oscillations derived therefrom with a definite fixed frequency obtained from another source and regulating the temperature of said oscillator in accordance with frequency variations of said oscillations from a fixed relationship to said fixed frequency, whereby the frequency of said oscillator is varied."

"8. The method of maintaining substantially constant the frequency of a piezo-electric oscillator whose frequency is a function of temperature, which comprises producing a wave whose frequency is controlled by the frequency of said piezo-electric oscillator and controlling the temperature of said oscillator in accordance with variations in the frequency of said wave whereby the frequency of said oscillator is varied."

"16. The method of regulating the frequency of a piezo-electric oscillator which varies with temperature variations, by control of its temperature, which comprises producing a wave whose frequency is controlled by the frequency of said piezo-electric oscillator, and regulating the temperature of said oscillator in accordance with frequency variations of said wave, whereby the frequency thereof is varied."

[*Official Gazette January 22, 1935.*]